United States Patent [19]

Kupersmit

[11] Patent Number: 5,734,337
[45] Date of Patent: Mar. 31, 1998

[54] VEHICLE SPEED MONITORING SYSTEM

[76] Inventor: Carl Kupersmit, 7217 Catalina Isle Dr., Lake Worth, Fla. 33467

Related U.S. Application Data

[60] Provisional application No. 60/007,149 Nov. 1, 1995.

[21] Appl. No.: 741,520

[22] Filed: Oct. 31, 1996

[51] Int. Cl.$^6$ .................................................. G06G 1/054
[52] U.S. Cl. ........................... 340/937; 340/936; 340/938; 382/104; 382/275; 348/148; 348/149; 348/187; 73/1 D; 364/571.01; 364/571.02; 364/438
[58] Field of Search .................. 340/936, 937, 340/938, 939; 382/104, 107, 275; 348/148, 149, 187; 73/1 D; 364/571.01, 571.02, 438

[56] References Cited

U.S. PATENT DOCUMENTS

| | | | |
|---|---|---|---|
| 4,847,772 | 7/1989 | Michalopoulos et al. | 340/937 |
| 5,161,107 | 11/1992 | Mayeaux et al. | 340/937 |
| 5,177,794 | 1/1993 | Abe et al. | 382/48 |
| 5,249,238 | 9/1993 | Komerath et al. | 382/42 |
| 5,296,852 | 3/1994 | Rathi | 340/937 |
| 5,301,239 | 4/1994 | Toyama et al. | 340/937 |
| 5,323,470 | 6/1994 | Kara et al. | 382/48 |
| 5,329,368 | 7/1994 | Plotke | 382/42 |
| 5,351,044 | 9/1994 | Mathur et al. | 340/937 |
| 5,381,155 | 1/1995 | Gerber | 340/936 |
| 5,392,034 | 2/1995 | Kuwagaki | 340/933 |
| 5,402,118 | 3/1995 | Aoki | 340/937 |
| 5,404,306 | 4/1995 | Mathur et al. | 364/438 |
| 5,432,547 | 7/1995 | Toyama | 340/937 |
| 5,509,082 | 4/1996 | Toyama et al. | 340/937 |

*Primary Examiner*—Jeffrey Hofsass
*Assistant Examiner*—Daniel J. Wu
*Attorney, Agent, or Firm*—Quarles & Brady

[57] ABSTRACT

A method for determining the speed of a vehicle using a camera. The method automatically compensates an apparent speed determination for inaccuracies due to the position of the camera with respect to the vehicle. The invention also includes a method for calibrating a camera to compensate for inaccuracies due to the position of the camera.

36 Claims, 5 Drawing Sheets

5,734,337

VEHICLE SPEED MONITORING SYSTEM

FIELD OF THE INVENTION

This application claims the benefit of provisional application Ser. No. 60/007,149, filed on Nov. 1, 1995.

The invention relates to a traffic monitoring system and more particularly to a method and apparatus for recording and recognizing vehicle speeding violations at remote locations.

BACKGROUND OF THE INVENTION

Speed limit signs are provided to arbitrate the movement of vehicles along traffic lanes in an orderly fashion to prevent collisions or other conflicting situations that could lead to loss of life and property. Speed limit signs operate on an honor system which requires drivers to be cognizant of and obey the laws that apply in areas where the signs are posted.

The most common way to identify a speeding violation is for an officer to use a microwave, radar or laser device to bounce signals off a moving vehicle to estimate vehicle speed. While an officer that is physically present at a scene can observe and accurately determine if violations occur, violation detection methods that require an officer to be present to identify a violation have a number of shortcomings. Most importantly, the effectiveness of any method which requires an officer to be present when a speeding violation occurs is limited by personnel constraints. Because there are only a limited number of officers, vehicle drivers know that only a small percentage of the total number of speeding violations committed will be detected and prosecuted. For this reason the present honor system is routinely abused and speeding violations are consciously committed on a regular basis with almost total impunity. As a result the overall danger associated with driving is increased substantially.

In addition, most speed detection devices require frequent calibration and calibration certificates are often required as evidence in court to convict a violator. In fact, in some cases the absence of a calibration certificate can help acquit an accused party.

Moreover, with speed sensing devices it is particularly difficult to precisely pinpoint which vehicle a reading comes from when several vehicles are traveling very close together, one behind the other or next to one another, in the field of the device. Therefore, many violators escape prosecution, even though a violation may have been detected.

Furthermore, when a speeder is detected the officer that identifies the speeder must usually chase, stop and approach the speeder to issue a citation. This activity is dangerous to the public, potentially life threatening to the law enforcement officer and requires too much of an officer's valuable time for a single citation. Because every offender must be stopped individually, it is impossible for a single officer to issue citations to every offender in an area that is monitored.

In order to alleviate some of the burden placed on law enforcement officers, an entire industry has developed around automatic systems for recording traffic violations, recorded violations reviewed at a later time for the purpose of issuing traffic citations.

With respect to automated speed monitoring, systems have been devised wherein, when a vehicle passes through a camera's viewing field the camera is triggered and takes two consecutive pictures of the vehicle, the pictures separated by a period of known duration. These systems use 35 mm photographic film in a modified camera. Several frames may be taken in succession to document the violation sufficiently. The film is later retrieved, developed and examined manually to verify the violation, magnify the images so that a license plate can be read, look up the vehicle ownership information and issue a citation if warranted.

While these systems eliminate the need for an officer to be present to witness a violation, these systems have a number of shortcomings. These shortcomings are primarily that:

1. existing film based systems require manual loading and retrieval of film on a periodic basis, often daily;
2. film based systems require and additional process of developing the film through chemical means;
3. existing systems must rely on the use of radar technology or other primary means of acquiring vehicular speeds;
4. existing film systems require markings on the road as a secondary means of verifying radar accuracy and as a means of overcoming the non-linearities in the apparent displacement of the vehicle in the images;
5. because film based systems are mechanical, the interframe time differences are not very accurate or repeatable and may vary due to temperature, wear and other environmental conditions, thereby yielding inaccurate speed estimations; and
6. film based systems cannot be fully automated and always require some human interaction in the review process.

Therefore, it would be advantageous to have a method and an apparatus that could automatically monitor traffic at remote locations, accurately identify speeding violations and provide a record of speeding violations. In addition, it would be advantageous if such a system could automatically identify a license plate number, look up ownership information and automatically issue a citation when warranted.

SUMMARY OF THE INVENTION

The present invention includes a method used with a camera to record vehicle traffic in a traffic lane and accurately determine vehicle speed from at least two consecutive video images. After a camera has been set up so that its viewing field is directed toward the traffic lane, a first method is used to calibrate the camera so that the camera can be calibrated to compensate for speed detecting errors that are caused by apparent displacement distortions imposed by the geometric relationships involved in the generation of images with a camera lens, variations in the camera height, height of a reference point on a passing vehicle, an inclination angle I which is the angle of the camera lens, and the viewing field angle $\omega$ which is the amount of camera zoom. After the calibration process, a second inventive method is used to determine vehicle speed.

The calibration process is for determining the actual viewing field angle $\omega$ and the actual lens height H. The method used with a computer that includes dimension data of actual reference vehicle features. The calibration method comprises the steps of, assuming initial lens height H, inclination angle I and viewing field angle $\omega$ approximations where the assumed inclination angle is the known inclination angle, identifying specific sequential images containing the passing of a reference vehicle through the viewing field, sequential images acquired at known time intervals, the reference vehicle including a dimensioned reference vehicle feature of known actual dimensions and at least two reference vehicle features of known and different actual heights off a ground plane, identifying reference images from the specific sequential images wherein the reference images contain the dimensioned feature and the reference features of known heights.

The method also includes the steps of determining the apparent displacement of the reference features of known heights between two consecutive reference images and the apparent dimensioned feature dimension, calculating a new camera height approximation based on the apparent displacements of the reference features and comparing the apparent and actual dimensioned feature dimensions. Where the apparent dimension is larger than the actual dimension and not within a predetermined range, the method includes the step of reducing the approximated initial viewing field angle by a predetermined amount and reducing the predetermined amount. Where the apparent dimension is smaller than the actual dimension and not within the predetermined range, the method includes the step of increasing the initial approximated viewing field angle by a predetermined amount and reducing the predetermined amount.

Next, the method includes the steps of re-determining the apparent dimensioned feature dimension with the new viewing field angle, where the apparent dimension is not within the predetermined range of the actual dimension, re-adjusting the viewing field angle until the apparent dimensioned feature dimension is within the predetermined range of the actual dimensioned feature dimension.

Continuing, the method includes the steps of determining the difference between the initial and the new viewing field angle approximations and the difference between the initial and the new height approximations and, where the differences are below a predetermined magnitude, storing the new height approximation and the new viewing field angle approximation for use in determining vehicle speed. However, where the new viewing field angle approximation is appreciably different than the initial viewing field angle approximation or the new height approximation is substantially different than the initial height approximation, the entire calibration method is repeated with the new height approximation as the initial height approximation and the new viewing angle approximation as the initial approximation.

One object of the invention is to calibrate a camera and speed sensing system so that the system can compensate for varying camera height, inclination angle and viewing field angle. Substantially ideal and precise height and angle information can be derived according to the inventive calibration method.

Preferably, the dimensioned feature has a reference dimension that is substantially parallel to the direction of vehicle movement, the reference dimension being a feature length L, the reference vehicle features of known height being one feature at an actual height of Q from the ground plane and the other feature being at an actual height P from the height Q. Here the step of identifying specific sequential images includes the steps of generating a first image while the dimensioned feature and the first feature of known height are in the viewing field, generating a second image while the first and second features of known height are in the viewing field and generating a third image while the second feature of known height is in the viewing field.

Also preferably, the calibration method is used with an apparatus including a screen for displaying the images, the screen including a plurality of pixels that together form the images and a reference point. Here the step of determining the dimensioned feature dimensions includes the steps of displaying the first image on the screen, identifying the boundaries of the dimensioned feature and counting the number of pixels between the boundaries.

Another object of the invention is to use the inventive method with hardware that facilitates automatic dimension measuring. By using a CRT wherein images are formed using pixels or the like, relative positions on the images can be identified by a computer which counts pixels and converts the pixel positions to actual positions.

Another object is to simplify the calibration process. With a CRT, an operator can simply identify vehicle features of known dimensions and heights on images of a known reference vehicle and the computer can use trigonometric relationships between the features and pixel positions on the images to determine both camera height H and the viewing field angle $\omega$.

The step of determining the apparent displacement of the reference features may include the steps of, for the first feature of known height, displaying the first image on the screen, identifying a position of the first feature in the first image, counting the number of pixels between the reference point and the first feature position in the first image to provide a first pixel position, displaying the second image on the screen, identifying a position of the first feature in the second image, counting the number of pixels between the reference point and the first feature position in the second image to provide a second pixel position, compensating both the first and second pixel positions and subtracting the first from the second pixel positions. For the second feature of known height, displaying the second image on the screen, identifying a position of the second feature in the second image, counting the number of pixels between the reference point and the second feature position in the second image to provide a third pixel position, displaying the third image on the screen, identifying a position of the second feature in the third image, counting the number of pixels between the reference point and the second feature position in the third image to provide a fourth pixel position, compensating both the third and fourth pixel positions and subtracting the third from the fourth pixel positions.

After the camera and speed monitoring system has been calibrated the invention also includes the method of determining vehicle speed within a traffic lane. The speed determining method comprises the steps of generating first and second images of the vehicle while at least one feature of the vehicle is in the viewing field, the one feature being a reference point on the vehicle, the second image following the first image by a known time period, determining the feature positions in the first and second images, converting the first and second image feature positions to actual positions within the traffic lane to compensate for non-linearities and mathematically combining the first and second actual positions and the known time period to determine a precise vehicle speed.

Thus, another object of the invention is to determine the speed of a vehicle passing through a camera's viewing field in a manner that compensates for non-linearities between actual vehicle position on the road and apparent vehicle position in an image. To this end, with the camera height, inclination angle and viewing field angle known from the calibration method, the actual vehicle position on a road plane can readily be determined.

To configure the camera for determining vehicle speed, preferably the camera is positioned above the traffic lane through which the vehicle passes so that the viewing field is within the traffic lane and the lens is angled at least partially downwardly so that a line between the lens and the center of the viewing field defines the inclination angle I below a horizontal plane at the level of the lens. The step of converting the feature positions includes determining the approximate height Q of the feature from the ground and mathematically combining the feature height Q and the camera height H with each of the feature positions.

Preferably, most vehicles have the one feature, the feature height from ground is approximately equal on most vehicles and the step of determining the feature's height includes the step of assuming that the height is the height of the feature on most vehicles.

Yet another object of the invention is to substantially compensate for reference point height on a vehicle even where precise height information is not available. To this end, the inventive method recognizes that the vehicle height off the ground of a typical car is approximately 20 inches. With this assumption and using known trigonometric relationships, the approximate height of any vehicle feature that appears in at least two consecutive images can be determined and used for height compensation purposes.

Also, preferably, the speed monitoring method is used with an electronic camera, a computer for storing images and a screen. The camera generates the first and second images and the computer stores the images and displays the images on the screen, the screen having a reference point. Each image includes a plurality of pixels. The step of converting the feature positions includes, for each of the first and second images, determining the pixel positions between the reference point and the feature.

The inclination angle and the viewing field angle determine the geometry of the non-linearity in each of the first and second images and the step of converting the feature positions also includes the step of, after determining the number of pixel positions, converting the pixel positions to a length measurement along the ground and compensating the length measurement to compensate for the image non-linearities.

Another object of the invention is to provide a system wherein a computer can evaluate vehicle images and determine vehicle speeds. To this end, the pixel positions in a video image are converted to actual measurement lengths (e.g. feet, meters, ... ). Then, using feature displacement and the time between images, the computer can automatically determine speed.

Preferably the method is also used to identify a license plate number, the method further including the steps of, identifying a license plate in an image and identifying the license plate numbers. In this case the method may also be used with a relational indexed database which correlates the feature height and the license number. Here the step of determining feature height includes the step of, after determining the license plate number, identifying the license number in the database and an associated feature height.

Thus, another object of the invention is to use precise vehicle feature height information to determine vehicle speed. A relational indexed database can be used to determine the type of vehicle in the viewing field once the license plate number has been determined. Once vehicle type is known, the typical dimensions for the vehicle type can be used to compensate for non-linearities caused by feature height in images.

The inventive method may also be used with a citation generating printer and further include the step of, after the speed and license plate number are determined, determining if the speed is in excess of a speed limit and, if the speed is in excess of the speed limit, looking up vehicle ownership information in the database, obtaining a mailing address for the vehicle owner and issuing a citation including image information.

Yet another object of the invention is to provide a substantially automatic speed detecting and citation issuing system and method. Once vehicle speed is determined a computer can easily compare speed to a maximum speed in a traffic lane and determine if a speed violation occurred. Where a speed violation occurred, the computer can issue a citation including vehicle images.

The invention also includes a second more general method of calibrating the speed detecting system including the steps of measuring the inclination angle I, determining the actual height H of the camera and an optimal viewing field angle $\omega$, adjusting the camera to provide the optimal viewing field angle $\omega$, and providing software code to compensate for image distortion due to the viewing field angle, inclination angle and camera height.

Thus, in its simplest form the calibration method includes simply identifying workable inclination angle, viewing field angle and camera height values and using those values to program a computer to compensate for non-linearities between the image and the ground.

These and still other objects and advantages of the present invention will become apparent in the following description and with reference to the figures which make up this specification.

DETAILED DESCRIPTION OF THE INVENTION

A. Monitoring Speed

1. Hardware Configuration

Figure 1:
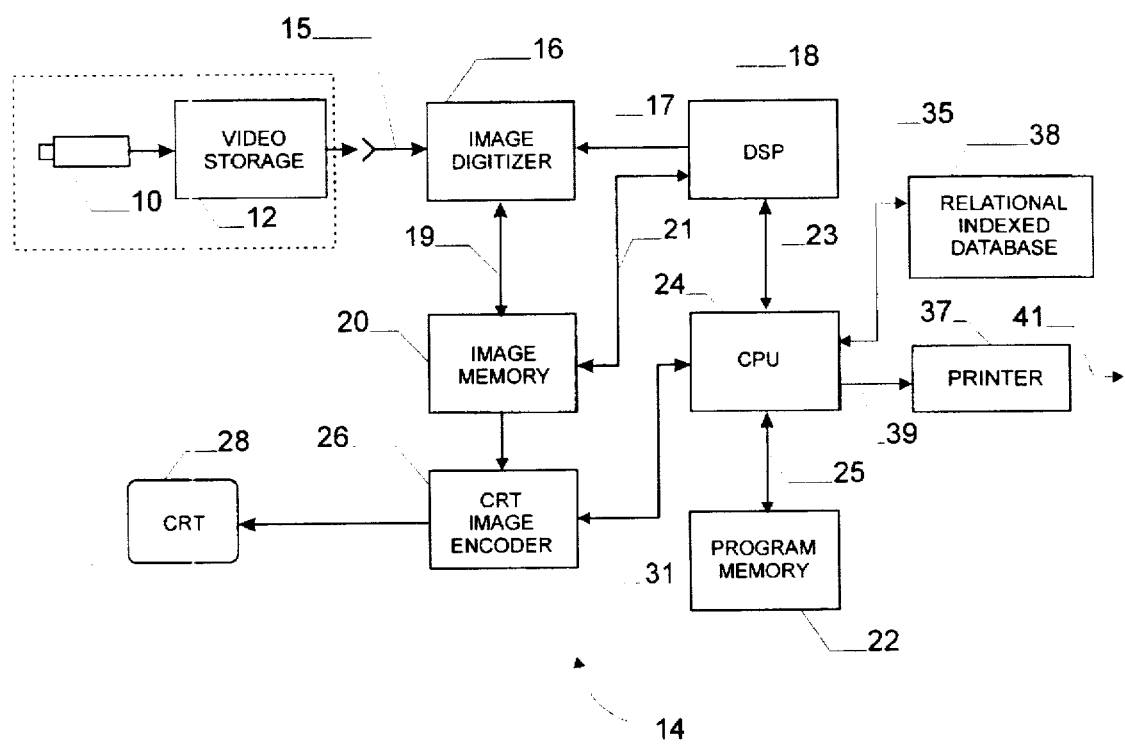
FIG. 1 is a block diagram of a speed monitoring system according to the present invention.

Referring now to FIG. 1, the inventive speed monitoring system includes a motion video camera and recorder 10, such as a camcorder, which records video in NTSC or PAL format onto a magnetic tape device such as a videocassette 12, a computer 14, a public records relational indexed database 33 and printer 37. The computer 14 includes video processing hardware such as an image digitizer 16, commonly known as a frame grabber, a digital signal processor (DSP) 18 that can perform operations on the image data in two dimensions, memory 20 to store one or more digitized frames of video and memory 22 to store executable software code, a central processing unit CPU 24 and a CRT image encoder 26 for encoding image information into a form suitable for driving a CRT 28.

The camera 10 is connected via line 15 to the image digitizer 16 providing pictures thereto. The image digitizer 16 is connected to the DSP via line 17 and to the image memory 20 via line 19. The image memory 20 is connected to the DSP 18 via a two way bus 21 so that digitized images can be passed therebetween. The DSP 18 is linked to the CPU 24 via two way bus 23 and the CPU communicates with program memory 22 via bus 25. The image memory 20 is linked to the CRT image encoder 26 via line 27 so that image data can be transferred to the CRT 28 and the CPU 24 is limited to the encoder 26 via line 31 for controlling the encoder 26. The CPU 24 is also connected via bi-directional bus 35 to the database 33 and via line 39 to the printer 37.

In addition, although not shown, the system of FIG. 1 also includes an interface means such as a keyboard or a mouse so that an operator can manipulate images stored in the memory 20 and instruct the computer 10 generally on required functions. Software code in memory 22 can be used to manipulate images and to insert markers for the purpose of making measurements on objects displayed in an image.

Preferably, the relational indexed database 33 is a database that includes vehicle information (e.g. drivers name and address, the height of a vehicle's bottom from ground, vehicle weight, etc. . . . ) indexed by license plate number. The CPU 24 can access vehicle information via the database 33 as will be described in more detail below.

Figure 2:
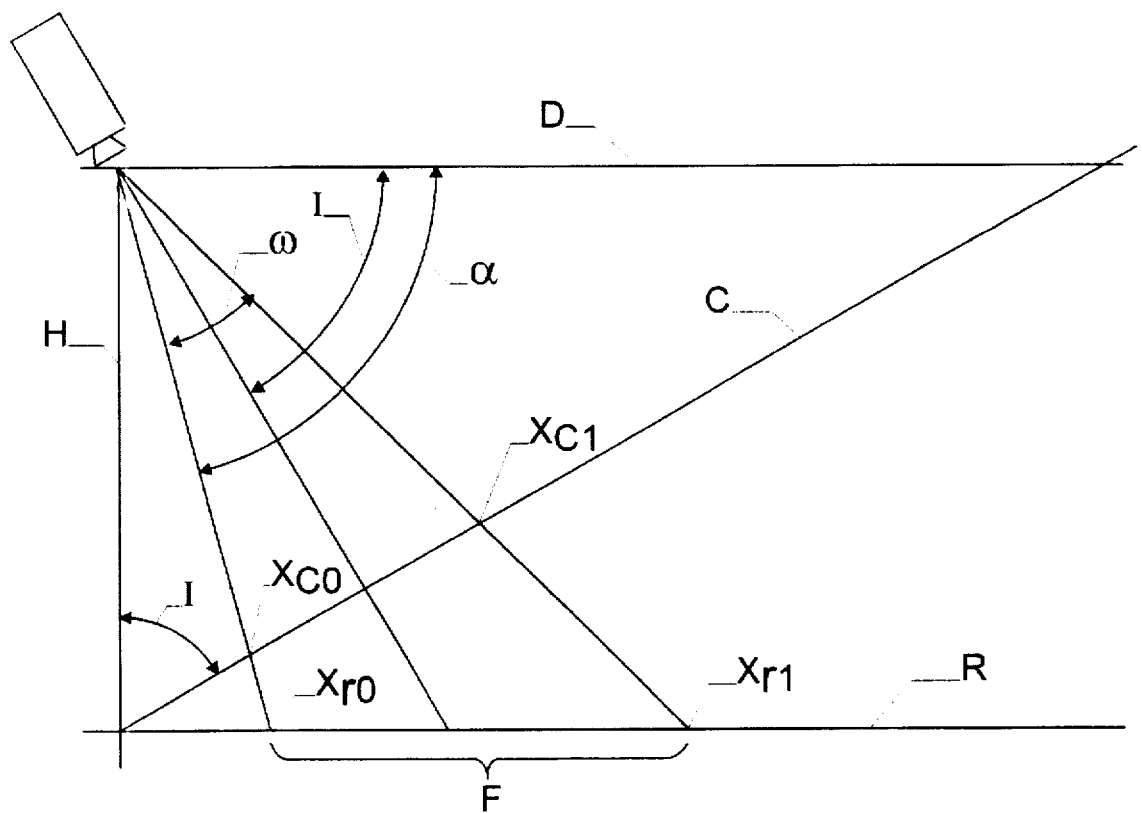
FIG. 2 is a schematic showing the geometry associated with the speed sensing camera of FIG. 1.

Referring also to FIG. 2, preferably the camera 10 is installed above a traffic lane at a height H pointing partially downward and along the direction of vehicle travel so that the center of a viewing field F is centrally located at an inclination angle I from a horizontal plane D in which the camera 10 is located.

It can be shown experimentally and geometrically, that optimal viewing can be obtained where the camera height H is approximately six (6) meters or higher. Clearances below bridges which extend over highways are typically a minimum of 14 feet, producing a top-of-the-bridge height of about 18 feet or higher, or approximately 5.5 meters. A camera 10 can therefore easily be positioned consistently 6 meters or higher above the passing traffic.

To obtain good automatic acquisition of license plate identification, the image must be zoomed in as much as possible while still preserving enough of a wide view to see the relevant features (i.e. the roof, a door, the trunk lid, etc. . . . ) of a reference vehicle as demands in the calibration section below, and also to consistently have at least two consecutive frames with a speed measurement reference point on every vehicle.

To illustrate this point, if the camera 10 is zoomed in too close, the view of the road would be very short and narrow, and any single point of reference on a passing vehicle would appear in only a single frame. This would not permit measuring of vehicle speeds. An additional problem is presented by the fact that, if the camera 10 is capturing a narrow view of the traffic lane, vehicles that are skewed to either side of the lane could have their plates completely off the image which would render the images useless. Conversely, if the camera 10 is not sufficiently zoomed in on the passing vehicles, the license plate might be too small to read and reference car measurements would be too small. In this case, the acquisition of required measurements would occupy too few video image pixels thereby yielding inaccurate image positions.

A viewing field angle ω or angle of zoom should be small so that the apparent displacement of a moving vehicle in the image is substantially linear and proportional to the actual road displacement of the vehicle to obtain a good first approximation of the mathematical relationship between the actual road displacement of the vehicle and the apparent displacement on a resulting video image. Optimal results can be obtained by zooming the image enough to see the entire rear of the car with a lateral margin on either side of about one foot (30.4 cm). Precise zooming is not required. It can be demonstrated geometrically and empirically that, typical viewing angles 2·(α–I) as depicted in FIG. 2 should be approximately 5° or smaller when the camera height H is approximately 6 meters.

2. Speed Measuring and Violation Detecting Method

The steps to be followed in the preferred speed measuring process will be illustrated using the example of an overhead, rear view of passing vehicles as described above. The following assumptions are made and are implicit in the inventive speed measuring process.

Figure 3:
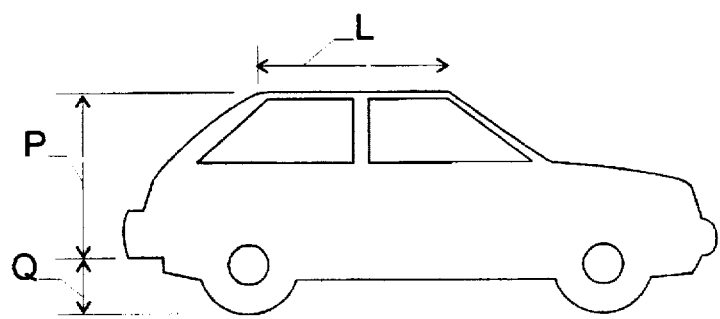
FIG. 3 is a schematic of a vehicle showing reference dimensions.

First, referring to FIG. 3, the height of an easily identifiable reference for each vehicle such as the height Q of the vehicle from the ground is stored in the relational indexed database 33 which is accessible by using the license plate identity as an index. In the alternative, the height of the bottom of any vehicle can be assumed to be approximately 20 inches for cars and higher for trucks with some variability.

Second, where the height of the bottom of the vehicle is assumed to be 20 inches, the variability between vehicle heights is small enough to affect speed measurement within acceptable deviations in accuracy. For example, if the variability is ±12 inches (0.3048 m), and the camera height H is greater than 6 meters, the error will be 0.3048/6 or a maximum of ±5.0% in the worst case.

Third, information on what type of vehicle is being observed can readily be obtained after a license plate is identified by looking up corresponding data records in a state's database of motor vehicles.

Fourth, speed measurements can be initially recorded in any unit of measure and converted to MPH during the process of looking up the license plate data so that information on vehicle type or pre-stored dimension information can be used to optimize the measurements.

Figure 4:
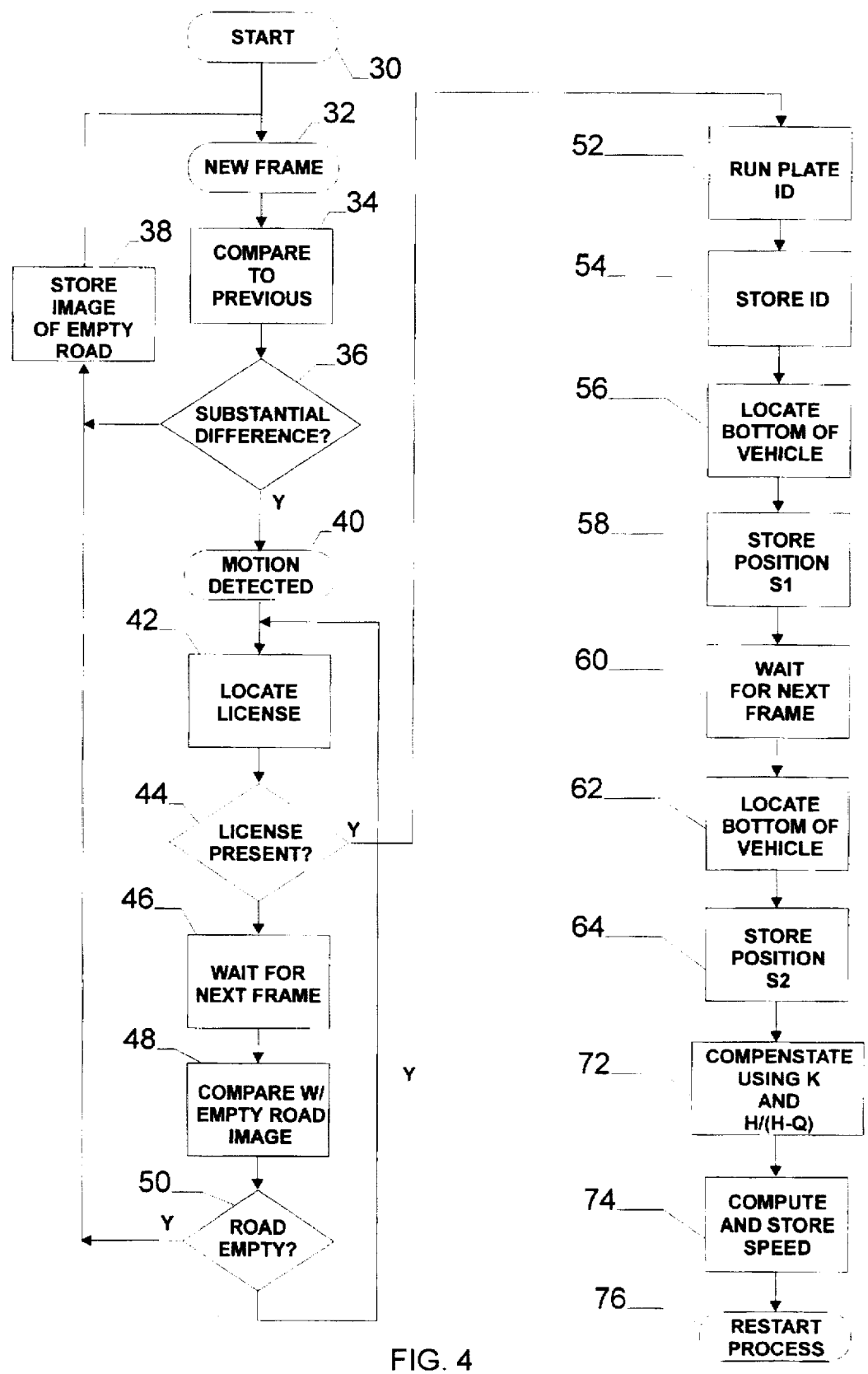
FIG. 4 is a flow chart showing a speed determining method according to the present invention.

Referring also to FIG. 4, with the above assumptions, the inventive method for determining a vehicles speed is illustrated. Initially, when the system in FIG. 1 is turned on at block 30, the computer 14 receives a new image or frame at block 32, the digitizer 16 generates a digitized image and provides the image to the CPU 24 through the DPS 18. The CPU 24 runs a motion detection process to determine if a moving vehicle is present in the image. The motion detection process compares successive video frames to detect a change in the image from that of the pattern generated by the road surface. As a vehicle moves into the scene disturbing such pattern, a gross deviation in video content produces a detectable difference between the present and previous frames that the computer can assume is caused by the presence of a vehicle in the image.

Such deviations can be detected using well known techniques of comparing video content in two images by creating a two-dimensional matrix of arithmetic differences of quantized image data. When the average of these differences becomes large, it is representative of drastic change in image content. Other means of detecting motion from a full motion video image are available and are generally well known in the prior art.

In FIG. 4 the motion detection process is represented by blocks 34, 36, 38 and 40. The CPU 24 compares the present image to the previous image at block 34 and determines if there is a substantial difference at block 36. Where there is not a substantial difference there is no moving vehicle in the camera's viewing field and the CPU 24 stores an image of the empty road at block 38 and control loops back to block 32 where a next frame is received by the CPU.

However, where there is a substantial difference at block 36, the CPU 24 recognizes that there is a moving vehicle in its viewing field at block 40. When a vehicle is detected in the camera's viewing field, the CPU 24 begins to step through a license plate location process to identify a vehicle license plate in successive video frames. This is accomplished by using a two dimensional, multiple stage neural network that has been trained to recognize the shape and general color and video content of a license plate. This technique of determining if a substantial difference in two consecutive images exists has been used in the prior art and is presently used and marketed by companies such as American Dynamics in Orangeburg, N.Y. Other mathematical or algorithmic techniques are also available.

The license plate location process is represented in FIG. 4 by blocks 42, 44, 46, 48 and 50. At blocks 42 and 44, after the CPU 24 determines that there is motion in the camera's viewing field, the CPU 24 begins searching for the presence of a license plate in the present image. If a license plate is observable in the present image the CPU 24 locates the license plate and control passes to block 52. However, if a license plate is not present in the present image, the CPU waits for the next frame at block 46.

Once the next frame is received, at blocks 48 and 50 the CPU 24 determines if the moving vehicle is still in the viewing field by comparing the present image with an image of the empty road. Where the present image is identical to an image of the empty road, the moving vehicle has left the viewing field and therefore control loops back to block 32 after the empty road image is stored at block 38. If the present image is not identical to an empty road image, CPU 24 control loops back up from block 50 to block 42 and the CPU 24 again tries to locate the license plate.

Once the plate is located in a given video frame, CPU 24 control passes to block 52 where another neural network based process or similar process such as optical character recognition (OCR) referred to herein as the "license plate identification process", manipulates the data in the digitized image containing the plate and identifies the characters and numbers on the plate, converting them to computer readable format such as ASCII code. The code can then be used to look up information about the vehicle in the public records relational indexed database 33. Information such as vehicle type, ownership, dimensions, weight, etc. is usually available in such databases. The license plate identification process is represented by blocks 52 and 54 in FIG. 4.

At block 56 the next step is to identify the bottom of the vehicle or some other reference point that can be easily located and for which a measurement of height off the ground can be obtained. At typical camera inclination angles I (e.g. 35 degrees from horizontal), the bottom of a vehicle is easily identifiable as the lowest point of the vehicle image below which the recognizable road pattern seen in previous frames appears. A frame difference technique as described above can be used here to identify the point on the image below the vehicle where the road pattern reappears.

This process is executed on one or more image frames after the location of a license plate, since it is assumed that the license plate is at the rear of a vehicle and the bottom of the vehicle should then be visible on the first frame containing the license plate or on a following frame. Once a vehicle's bottom is identified, the vehicle bottom's position S1 in the image is stored in CRT pixels or image lines at process block 58. For example, referring to FIG. 1, where the CRT 20 includes 500 horizontal lines and is 10 inches in height, each inch will include 50 horizontal lines. Where the vehicle bottom's position is three inches from the bottom edge of the CRT 28, position S1 would be measured and stored as 150 pixels or horizontal lines. Hereinafter image positions will be referred to as pixel positions.

Referring still to FIG. 4, after pixel position S1 has been stored, the CPU 24 advances to the next consecutive frame and locates the bottom of the vehicle in the next image at blocks 60 and 62. The vehicle bottom's position in this next frame is stored as pixel position S2 at block 64. The camera period or period between consecutive video frames is known and is preferably 1/29.97 seconds. The second pixel position S2 is displaced from the first pixel position S1 in proportion to the speed of the vehicle in the image.

With pixel positions S1 and S2 in two consecutive images stored, there is enough information for the CPU 24 to determine the speed of the vehicle. Knowing the camera period and the distance travelled as represented by the different pixel positions S1 and S2, an apparent speed can be determined by simply dividing the distance travelled by the camera period.

Unfortunately, because of the inclination angle I at which the camera 10 must be positioned in order to generate an image including the license plate, the apparent distance that the vehicle travels in the images is not an exact representation of the actual distance travelled by the vehicle during the camera period. In addition, the apparent distance travelled can also be skewed by the difference in vehicle height and camera height.

For this reason, after the two pixel positions S1 and S2 have been stored, each of the pixel positions S1 and S2 are compensated for camera inclination angle I, camera height H and the height Q of the bottom of the vehicle prior to determining speed. To this end, the following equation is solved for $X_r$ for each of the pixel positions S1 and S2 generating X1 and X2 to compensate for the inclination angle I:

$$X_r = K(H, I, \omega) = H \tan I \cdot \frac{Sn - Y_0}{\left(\frac{MH}{\cos I} + Y_0\right) - Sn} \qquad \text{Eq. 1}$$

where Sn is either S1 or S2 and represents the pixel position in the image corresponding with the actual road displacement $X_r$. M is a scalar conversion factor to convert $X_r$ into pixels and $Y_0$ is a bias in pixels applied to reference the bottom of the image as pixel position 0. Values for M and $Y_0$ will be shown to be readily obtainable from H, I and ω.

Next, with actual displacements X1 and X2 determined, the CPU 24 uses the identified license plate number to access the relational indexed database 33 to identify certain dimensions of the vehicle in the images. In particular, in order to compensate for the height of the vehicle's bottom from the ground, the database 33 is searched for vehicle height Q information. (See FIG. 3). Where the database 33 does not include vehicle height information or where no database is provided, the CUP 24 may, in accordance with the assumptions identified above, assume a typical vehicle height of approximately 20 inches from ground for cars (and a higher height for trucks).

When the height of the bottom of the vehicle is Q, the observed displacement in the images is larger than would be observed directly at the road surface by a factor H/(H-Q). Factor H/(H-Q) is referred to herein as the H function. Thus, to compensate for camera height and the height of the bottom of the vehicle, each road displacement X1 and X2 is divided by H/(H-Q) generating actual road displacements X1' and X2' and then the speed of the vehicle is determined according to the following equation:

$$v=(X2'-X1')*29.97 \text{ sec.} \qquad \text{Eq. 2}$$

The process of FIG. 4 starts all over again at block 76.

Preferably, the CPU 24 can organize the data from database 33 and speed calculation results from Equation 2 into an event record of information containing the measured vehicle speed, its license plate number; position on the video tape, time of day or other time reference; and the digitized image data from the two frames from which the speed was measured and which contain the image of the license plate.

Subsequently the CPU 24 can retrieve the event record, compare the calculated speed to a posted speed limit, determine whether a speed infraction has been committed, and, if in fact an infraction has been committed, link the license plate identification with the database 33 data to identify the vehicle's owner and mailing address. The CPU 24 can then print a citation 41 via printer 37 with the evidentiary video data to mail an appropriate fine.

Several different reference points for speed measurement can be used, including the position of the license plate itself. In a preferred embodiment the height of the plate off the road surface can be stored in the license registration database or can easily be acquired automatically from the image by identifying the bottom of the car and then estimating the height of the plate using geometric techniques.

B. Mathematical Derivation of Equation 1 and H Function

1. Equation 1

Referring again to FIG. 2, given a camera height H, an inclination angle I and a viewing field F bounded by the angle 2·(α–I) and previously labeled ω, an actual vehicle position on a road plane R can be determined from its position in an image by using ordinary trigonometric relationships.

In FIG. 2, the road plane R can be mapped onto an image plane C. As explained above, D is a camera plane representing the level of the camera 10 at height H from the road plane R. I is the inclination angle of the camera 10 from the horizontal camera plane, $X_c$ is a displacement along plane C from the origin where planes C and R intersect, representing the apparent displacement in the camera image, and $X_r$ is an actual displacement along the road plane R. $X_{co}$ and $X_{c1}$, represent the edges of the camera image and $X_{r0}$ and $X_{r1}$ are the corresponding viewing extremes along the actual road plane R.

The actual displacement from the origin can be calculated from the following Equations:

$$X_r = H \tan I \cdot \frac{X_c}{\left(\frac{H}{\cos I} - X_c\right)} \qquad \text{Eq. 3}$$

and $$X_c = \frac{H}{\cos I} \cdot \frac{X_r}{x_r + H\tan I} \qquad \text{Eq. 4}$$

Another useful relation is:

$$X_{rN} = H \cot\alpha \qquad \text{Eq. 5}$$

where α is the angle of inclination of a line emanating from the camera and intersecting R at $X_{rN}$. The corresponding $X_{cN}$ can be then determined from $X_{rN}$ by combining Equations 4 and 5.

To map the road plane R onto the image plane C, $X_r$ is converted using the following function:

$$y(X_c)=Mx_c+Y_0 \qquad \text{Eq. 6}$$

where M is a conversion factor to translate apparent distance along image plane C into CRT pixels or other convenient measurement of the acquired and digitized image, and $Y_0$ is a bias to reference the bottom of the image at y=0. M establishes the slope of the equation for $y(X_c)$ and so can be identified as $M=Y/(X_{c1}-X_{c0})$, where, on the image, Y is the equivalent span identified by points $X_{c0}$ to $X_{c1}$ on image plane C, measured in pixels or other convenient units of measure.

$Y_0$ is derived from $X_{c0}$ and M by the relationship $Y_0 - MX_{c0}$. This is seen from the fact that, as stated above, y should be 0 for $X_c = X_{c0}$. Therefore, plugging this condition back into $y(X_{c0})$, $0 = MX_{c0} + Y_0$, so $Y_0 = -MX_{c0}$. Finally, $X_c$ can be expressed in terms of y and substituted into the identity for $X_r$, to yield Equation 1 above.

2. H Function

The relationship expressed in Equation 4 illustrates the non-linearity of the relationship of the actual road displacement to the apparent displacement in the image as caused by the presence of $X_r$ in the denominator. However, substituting Equation 5 into Equation 4, we obtain:

$$X_c = \frac{H}{\cos I} \cdot \frac{\cot\alpha}{\cot\alpha + \tan I} \qquad \text{Eq. 7}$$

Equation 7 clearly shows that the amount of non-linearity and therefore percent error in the mapping of $X_r$ onto the image plane C is not dependent on camera height H at all, but only dependent on angle α. Equation 7 can be further reduced to:

$$X_c = \frac{\sin\alpha}{\cos(\alpha - I)} \cdot X_r \qquad \text{Eq. 8}$$

Examining Equation 8 it should be appreciated that as (α–I) gets very small, (2.5° for a field of view of 5°), the denominator approaches 1, (cos0=1). Similarly, sinα approaches sin I. For this reason, when the viewing field α is small, $X_c$ has a practically linear relation to $X_r$.

The relationship for $X_r(y)$ has been used to calculate the error resulting from the non-linear relation of y to $X_r$. Equation 1 above has been used to determine actual $x_r$ values for many different y values. Linearized values of $x_r$ have been determined by taking the extremes $X_{r1}-X_{r0}$ and dividing this span into equal linear increments. The percent error between actual and linearized values of $x_r$ was then determined. These computations were done for a camera height H of 6 meters, a viewing field w of 5°, an inclination angle I of 35° and a CRT having a maximum image height Y of 500 pixels. M and $Y_0$ were computed from these given values and the resulting $X_{c0}$ and $X_{c1}$ were calculated from the previously described identities. The maximum error as a percent of range was 3.12% assuming a linear $X_r$ as a function of y. Using the compensation function K the error was essentially eliminated.

Figure 5:
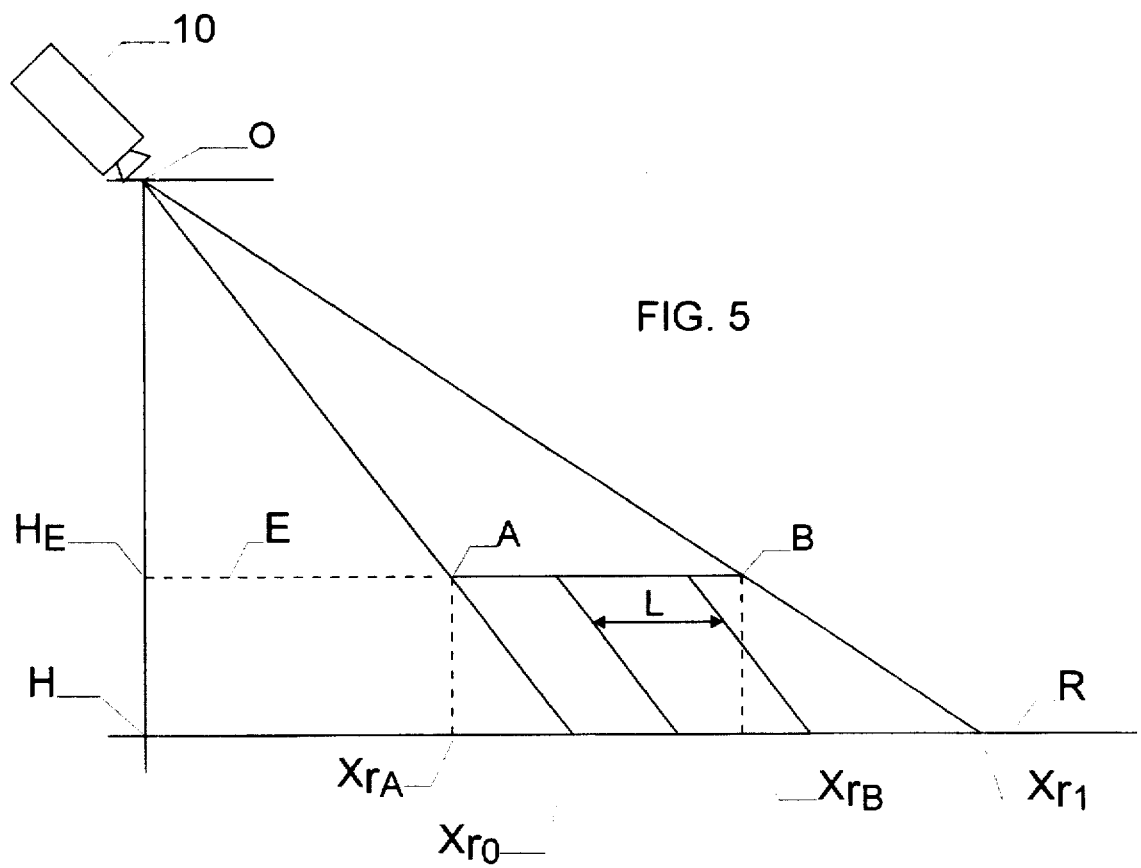
FIG. 5 is schematic showing geometry associated with the speed sensing camera of FIG. 1 and illustrating the apparent feature dimension distortion due to feature height.

FIG. 5 shows the basis for the linear inverse proportion relation expressed by the H function between measurements taken from the image and their actual vertical distance to the camera 10. For convenience, a variable measure of vertical height h is defined having an origin or zero value at the camera 10 position O. The lower extreme of the camera 10 viewing angle α is bound by line B. $X_{r0}$ and $X_{r1}$ are the viewing extremes along the road plane R. Line A is defined as $h=-H\cdot X_c/X_{r0}$ and line B is defined as $h=-H\cdot X_c/X_{r1}$. The horizontal span in view at the road plane R is $X_{r1}-X_{r0}$.

However, at any arbitrary plane E, at height $H_E$, the span along a horizontal plane which is in view, can be determined by plugging in $X_{rA}$ and $X_{rB}$ from FIG. 5 into the formulas for h above. Algebraic manipulation then yields:

$$\frac{X_{rB} - X_{rA}}{X_{r1} - X_{r0}} = \frac{H_E}{H} \qquad \text{Eq. 9}$$

Equation 9 can be interpreted to mean that the viewing span along plane E is smaller than that at the road plane R by a proportional factor $H_E/H$. Conversely, an object of length L seen on plane E appears larger than the same object on the road plane R by the inverse of said proportional factor, or $H/H_E$. This scalar can then be applied to any displacement measured on the image to compensate for the vertical distance of the camera 10 to the plane where the displacement is measured, thus giving us the basis for the height adjustments reflected in the H function (i.e. H/(H-Q)) which is used in the speed determination process.

C. System Calibration

After programming the CPU to determine speed according to the method illustrated in FIG. 4 wherein apparent image positions are compensated using Equations 1, 2 and the H function, variables H, I and ω have to be identified for specific camera placement so that Equation 1 and the H function can be calibrated accordingly. To this end the present invention also includes a calibration process wherein an iterative approach is used to determine correct H, ω and I values.

Parameters H, I and ω must be derived from video images during a camera 10 calibration process. Referring still to FIG. 2, before performing the calibration process, the camera 10 is secured to a bridge at a height H of approximately 6 meters from the road plane R. The camera 10 is pointed so that its viewing field F is directed at a single traffic lane therebelow. Through experiments it has been determined that, given a camera height H of approximately 6 meters, to obtain an image as described above, where non-linearity is reduced, a license plate is readable, and, at the same time, car features like the roof are measurable, the inclination angle I should be about 35 degrees from the camera plane D. Preferably, because the inclination angle I is easily controlled, the inclination angle should be precisely set to 35 degrees.

The viewing field angle ω and camera height H can be established by using the known length or dimension of a particular feature of a given reference vehicle such as, for example, a Toyota Camry and two measurements of the displacement of the known vehicle taken from two consecutive video frames. Referring to FIG. 3, the process will be illustrated by using the known length of a dimensioned feature, the roof of a reference vehicle that shall be labeled L, the known vertical height P from the bottom of the license plate to the roof line of the vehicle and the height Q of the bottom of the license plate from the road surface.

Through experiments it has been determined that given a camera height H of approximately 6 meters and an inclination angle of 35 degrees, the viewing field angle ω will always be approximately 5°. In a preferred method of calibrating, the calibration procedure is based on a first approximation of the conversion function K from Equation 1 with H=1 meter, I=35°, and ω=5°, or K(1,35,5).

By using this first approximation of function K, the general shape of the non-linearity of the image is approached, thus yielding the basis for an iterative successive approximation process that converges on true and accurate measurements of vehicle speed.

The actual compensation function K can be implemented by the CPU 24 and software through the execution of a mathematical identity or by using a look-up table. Since a typical digitized image from video has a maximum resolution of about 500 pixels in the vertical direction, the use of a lookup table to facilitate compensation can be very effective.

The following steps describe the inventive calibration method. The first step of the process is to play a video recording of vehicles passing through the viewing field on the CRT 28 while an operator is viewing the recorded and processed images. The process uses a motion detection function to freeze the first frame in a recorded video sequence showing a passing vehicle. After a first frame is frozen, the operator advances the video frame by frame to determine if the vehicle present in the video is a vehicle having known measurements. For example, the CPU 24 may include measurements for various parts of a well known vehicle (e.g. Ford Taurus or Honda Accord ...) that would be expected to pass through the monitored traffic lane.

Figures 6A, 6B, 6C:
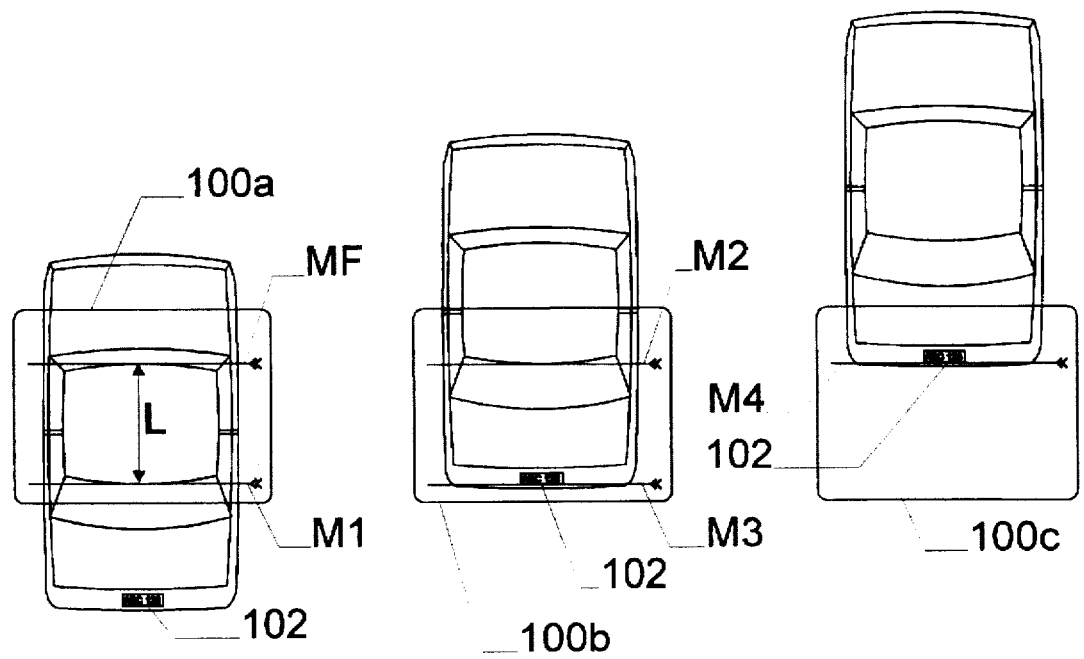
FIGS. 6(a)–6(c) are plan views of a vehicle passing through a viewing field.

Referring to FIGS. 6(a) through 6(c), three different plan views of a vehicle as may be seen from a properly placed camera 10 are illustrated. An image box, also referred to herein as a video frame 100a, 100b and 100c, has been laid over each plan view to illustrate the portion of the vehicle that is observable in the camera's viewing field F as the vehicle moves therethrough.

In the present example it will be assumed that the CPU 24 includes actual dimension information for the length L (See FIG. 3) of the vehicle's roof shown in FIG. 6(a). The first frame 100a in which the full length L of the roof is observable is illustrated in FIG. 6(a). This video frame 100a is digitized and frozen so that measurements can be taken from the image.

Referring to FIGS. 1, 3 and 6(a), with the roof L in view, the CPU 24 makes visible to the operator a horizontal line or marker M1 that can be moved vertically along the image until it matches the position of the extremes of the known roof length L of the vehicle. The computer software instructs the operator to position the marker M1 at the rear extreme of the roof. Once the marker M1 is precisely positioned as indicated, the operator issues a command to the CPU to store the measurement. The vertical position of this marker M1 measured in pixels along the image is then converted to meters using function K(1,35,5) where M1 is Sn and then stored as parameter M1'. (See FIG. 6(a)). The conversion can be done through the execution of a mathematical identity or by lookup table.

It shall be assumed from now on that the software instructs the operator where to place markers during each step of the calibration process. A marker MF is next positioned at the forward extreme of the roof L. Once the marker MF is precisely positioned as indicated, the operator issues a command to the CPU 24 to store the measurement. The vertical position of this marker MF measured in pixels is converted to meters using K(1,35,5) where MF is Sn and stored as parameter MF'.

The video is advanced to the next frame 100b, where the displacement of the rear extreme of the roof due to the forward speed of the vehicle will appear higher in the frame. A marker M2 is now manipulated by the operator to coincide with the new position of the rear of the roof L. (See FIG. 6(b)). The CPU 24 converts this position, labels the position M2' and stores the position. Now the difference between positions M1' and M2' represents the first approximation of the displacement of the reference vehicle in 1/29.97 seconds.

The video is now advanced, if necessary, to a first frame where the license plate 102 of the reference vehicle appears. This may be the same frame where the M2 measurement was taken, thus requiring no frame advance operation. A marker M3 is then moved to coincide with the position of the bottom edge of the license plate 102. Once the marker M3 is precisely positioned as indicated, the operator issues a command to the CPU 24 to store the measurement. The vertical position of marker M3 measured in pixels is converted by K(1,35,5) where M3 is Sn and stored as parameter M3'.

Next, the video is advanced to the next frame 100c, where the position of the license plate 102 due to the forward speed of the vehicle will now appear higher in the image. Marker M4 is moved to coincide with the new position of the bottom edge of the license plate 102. Once marker M4 is precisely positioned, the operator issues a command to the CPU 24 to store the measurement. The vertical position of marker M4 measured in pixels is converted by K(1,35,5) where M4 is Sn and stored as parameter M4'.

As demonstrated above in explaining Equation 9, once the image distortions are corrected using function K, the apparent displacement of an object or point in the image is inversely and linearly proportional to the vertical distance of the camera 10 to the horizontal plane where the measurement was taken. That is, the higher the point of measurement or reference point on the vehicle, the larger the apparent displacement will be.

From the above steps, the apparent displacement of the rear point of the vehicle roof on two consecutive frames has been quantified by M2'-M1' and stored. The apparent displacement of the bottom point on the license plate of the vehicle on two consecutive frames has also been quantified and stored as M4'-M3'. These two displacements are representative of, and proportional to, the speed of the reference vehicle since speed is displacement divided by time.

Since the speed of a vehicle is constant at any reference point, the apparent difference in the two measurements is solely due to the difference in height from the camera 10 to the reference points. The actual displacement at the road plane R must be exactly the same as that measured at the roof and at the plate 102. Thus the difference in the readings can be used to make a first assessment of the actual camera height H. Even if the two measurements were not taken on the same frames but within one frame of each other, any acceleration of the vehicle can be readily shown to be negligible in 1/29.97 seconds.

It can now be established that:

$$\frac{(M_4' - M_3')}{(M_2' - M_1')} = \frac{(H_p - P)}{H_p} \quad \text{Eq. 10}$$

where $H_p$ is the vertical distance of the camera 10 to the bottom of the license plate and P is the vertical distance from the roof to the bottom of the license plate as shown in FIG. 3. Since $H_p$ is the only unknown quantity in Equation 10 and $H=H_p+Q$, where Q is the known distance from the bottom of the license plate to the road surface on the reference vehicle, it can be established that:

$$H = Q + \frac{P \cdot (M2' - M1')}{(M2' - M1') - (M4' - M3')} \quad \text{Eq. 11}$$

Using Equation 11 the CPU 24 can calculate a first approximation of the camera height H. This first approximation of H shall be labeled H1.

Next, a new conversion function K(H1,35,5) is generated which is a mathematical identity that can be executed in software or by using a lookup table.

The measurement MF'-M1' is representative of the length L of the reference vehicle roof. However, this measurement must be adjusted for the height P+Q of the vehicle's roof since it will appear larger in proportion to the ratio of camera height H to the height from the vehicle roof to the camera 10, or H/(H-P-Q). Using this adjusted measurement, we can assess the accuracy of our second approximation for K. Since the vehicle roof length L is known, the error between the calculated L (i.e. (MF'-M1')xH1/(H1-P-Q)), and the actual known L can be used to now obtain a second approximation for the proper viewing field angle ω. To do this, a goal seeking algorithm is used. If (MF'-M1')xH1/(H1-P-Q) is larger than the actual L, then the first approximation for ω is too large. Conversely, if (MF'-M1')xH1/(H1-P-Q) is smaller than the actual L, then the first approximation for ω is too small. Depending on the outcome of the comparison, ω is increased or decreased by ω, and a third approximation of K is obtained as K(H1,35,ω1= ω0±ω0), where ω0=5°, the original value ω.

Using the new K(H1,35,ω1=ω0±ω0), (MF'-M1')xH1/(H1-P-Q) and the actual L are compared again and a next approximation of K is obtained as K(H1,35,ω2=ω1±ω0/2), where ω0 has been divided by a factor of 2. The process is repeated, halving ω0 every iteration to obtain K(H1,35,ω3= ω2±0/4), K(H1,35,ω4=ω3±ω0/8) and so on successively. This process, commonly known as a binary search successive approximation method is iterated until the error between (MF'-M1')xH1/(H1-P-Q) and the actual L is minimized to below 0.00001% to obtain a new approximation for K, or k(H1,35,ωn)).

Using the new K(H1,35,ωn), M2'-M1' and M4'-M3', are redetermined by using the new height approximation H1 in Equation 1 and the S1 and S2 pixel positions to determine M1 through M4 and then compensating for camera height (i.e. multiplying by (H1/H1-Q)). Once again, the displacements M2'-M1' and M4'-M3' are used to obtain the next approximation for H. Again the relationship in Equation 11 is used. Since H1 was obtained from Equation 11 with K(1,35,5) or H=1, the relationship will now yield a more accurate H that shall be labeled H2.

Using new height approximation H2, the next approximation for K, K(H2,35,ωn) is generated. This again generates an error for the comparison between (MF'-M1')xH2/(H2-P-Q) and the actual L. Using this error the method above is repeated to obtain k(H3,35,ωm).

The method above is repeated until HN and ωm are changing by an insignificant percentage. At this point, a final conversion function K is obtained that will be inaccurate only to the extent dictated by the resolution of the image and the accuracy of the placement of the markers. Accuracies in the order of 3% or better can be obtained.

To improve the accuracy of the calibration method above, several other instances of a reference vehicle can be located on the video sequence and the entire calibration process can be repeated using the last K to again obtain H and ω. These several instances of H and ω can be averaged to reach a highly accurate calibration.

D. Other Embodiments

While inventive methods have been described above, it should be appreciated by those of ordinary skill in the art that the description above has only been given by way of example and that various modifications and additions might be made while still coming within the scope of the invention. For example, while the present invention has been described as one wherein the camera 10 is located above a traffic lane, clearly the invention could be practiced where the camera is placed along the side of a traffic lane so that lateral vehicle images result.

In addition, while the preferred system would be totally automated after calibration so that the CPU 24 could automatically determine if a speeding violation occurred and issue a citation, clearly the system could be less automated. For example, after vehicle images are received, the CPU 24 could store the images for later retrieval and evaluation by an officer. The officer could manually identify a single reference point on two consecutive images and the CPU 24 could then determine the speed of the vehicle. Then the officer could identify the vehicle plate and issue a citation if required. In this case, the important aspect of the invention is the step of automatically and accurately compensating for the effects of the inclination angle I, the camera height H and the height Q of the vehicle from the ground.

Figure 7:
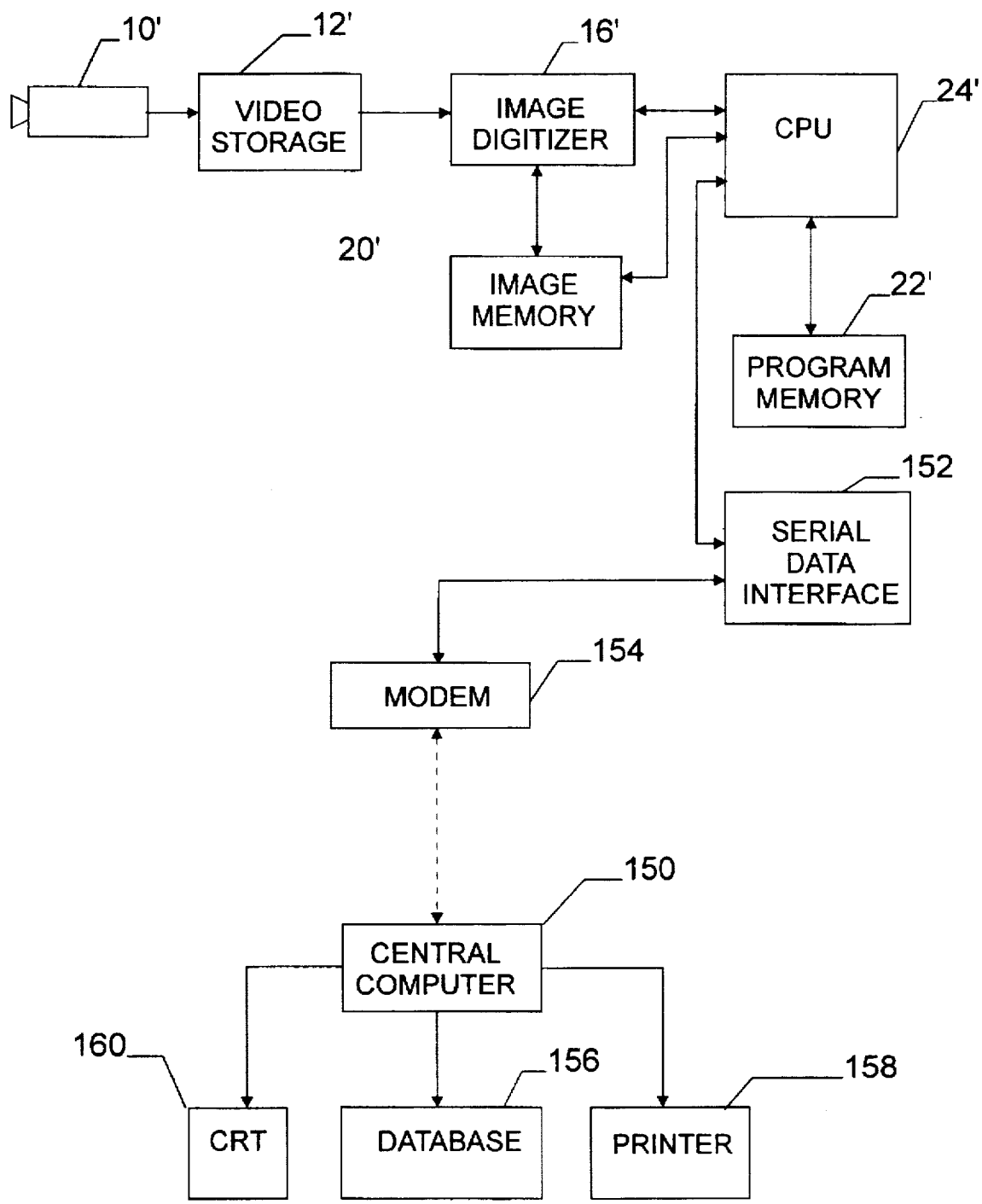
FIG. 7 is a schematic of a second embodiment of an inventive speed sensing and monitoring system according to the present invention.

Moreover, referring to FIG. 7, in another preferred embodiment, some of the computing functions may be performed by a central computer system. In this case, the speed monitoring system would include a camera 10', an image digitizer 16', a remote CPU 24', an image memory 20', a program memory 22', a serial data interface 152 and a modem 154. In addition, the central computer 150 would be connected to a CRT 160, a database 156 and a printer 158 for generating citations. System components in FIG. 7 that are the same as those in FIG. 1, unless noted herein, can be assumed to operate in the same manner as identically named components in FIG. 1 and as described above.

With the system of FIG. 7, in one embodiment the CPU 24' can receive images from the image digitizer and memory and determine vehicle speed according to the method of FIG. 4 assuming a typical vehicle height of 20 inches. After speed is determined the CPU 24' can compare vehicle speed with the speed limit and determine if a speeding violation has occurred. Where speeding has occurred, the CPU 24' can interface with the modem 154 via the serial data interface 152 and send a complete violation record to the central computer 150 which may be located at a local police station or the like. At the police station the central computer 150 can then process the violation record. To this end, the central computer 150 could verify and more accurately determine the vehicle speed by identifying exact reference point height via the database 156. Then, if in fact speeding occurred, the central computer 150 could issue a citation via printer 158.

In the alternative, with the configuration in FIG. 7, upon receiving images of a vehicle the remote CPU 24' may simply assemble an event record including a plurality of vehicle images which can be sent to the central computer 150 via the interface 152 and the modem 154. In this case, when an event record is received by the central computer 150, the central computer 150 can step through the method of FIG. 4 to determine if a speeding violation occurred. With this method, most of the computing processes can be provided by the central computer 150 which can support many remote CPU's 24' and reduce required computing power.

Furthermore, in any of the aforementioned systems, the CPU 24 or central computer 150 could automatically make an initial assessment of whether or not a speeding violation occurred and only provide records to an officer that relate to likely violations for review. In this case, an officer could make the final determination as to whether or not a citation should be issued.

Furthermore, some of the steps in the methods described above may be altered without affecting the accuracy of the speed monitoring system, thus yielding alternate but equivalent embodiments of the invention.

To appraise the public of the scope of this invention I make the following claims.

I claim:

1. A method for determining a vehicle's speed within a traffic lane, the method to be used with a camera including a lens and a viewing field that generates images of the vehicle within the camera's viewing field, the method comprising the steps of:
    generating first and second images of the vehicle while at least one feature of the vehicle is in the viewing field, the one feature being a reference point on the vehicle, the second image following the first image by a known time period;
    determining the feature positions in the first and second images;
    converting the first and second image feature positions to actual positions within the traffic lane to compensate for non-linearities; and
    mathematically combining the first and second actual positions and the known time period to determine a precise vehicle speed.

2. The method of claim 1 wherein the first and second images are the only images.

3. The method of claim 1 wherein the step of determining the feature positions includes the steps of displaying the image on a screen and manually identifying the feature on the image.

4. The method of claim 1 further including the steps of, prior to generating the images, determining if a vehicle is in the viewing field.

5. The method of claim 4 wherein the step of determining if a vehicle is in the viewing field includes the step of identifying when the image received by the camera appreciably changes.

6. The method of claim 5 further including the steps of, when the image received by the camera changes appreciably, freezing the first appreciably changed image and storing the next few images.

7. The method of claim 1 wherein the camera is positionable above the traffic lane through which the vehicle passes so that the viewing field is within the traffic lane and the lens is angled at least partially downwardly so that a line between the lens and the center of the viewing field defines an inclination angle I below a horizontal plane at the level of the lens, and wherein a camera height H above the ground is known and the step of converting the feature positions includes determining the approximate height Q of the feature from the ground and mathematically combining the feature height Q and the camera height H with each of the feature positions.

8. The method of claim 7 wherein the inclination angle is less than 90 degrees and the viewing field points at least partially in the direction of vehicle movement.

9. The method of claim 7 wherein most vehicles have the one feature, the height of the feature is approximately equal on most vehicles and the step of determining the features height includes the step of assuming that the height is the height of the feature on most vehicles.

10. The method of claim 7 for use with a camera positioned so as to define an inclination angle of between 20 and 60 degrees.

11. The method of claim 7 wherein the step of mathematically combining the camera height, feature height and feature positions includes the steps of compensating each feature position for feature height to produce first and second compensated feature positions, subtracting the first compensated feature position from the second compensated feature position to generate a position difference and dividing the position difference by the known time period to obtain speed.

12. The method of claim 11 wherein the step of compensating the feature positions includes the step of solving the following equation for each of the feature positions:

$$X_n'=X_n/(H/H-Q)$$

where $X_n$ is the uncompensated feature position and $X_n'$ is the compensated feature position.

13. The method of claim 7 for use with an electronic camera, a computer for storing images and a screen, the camera generating the first and second images and the computer storing the images and displaying the images on the screen, the screen having a reference point, each image including a plurality of pixels, the step of converting the feature positions including, for each of the first and second images, determining the pixel positions between the reference point and the feature.

14. The method of claim 13 wherein the screen's reference point is at the bottom of the screen.

15. The method of claim 13 wherein the inclination angle and a viewing angle determine the geometry of the distortion in each of the first and second images and the step of converting the feature positions also includes the step of, after determining the number of pixel positions, converting the pixel positions to a length measurement along the ground and compensating the length measurement to compensate for the image distortion.

16. The method of claim 15 wherein the steps of converting the pixel positions and compensating for the image distortion include the step of solving the following equation:

$$X_r = H \tan I \cdot \frac{S - Y_0}{\left(\frac{MH}{\cos I} + Y_0\right) - S}$$

where $X_r$ is the actual position of the feature, S is the number of pixels between the reference point and the feature in an image, $Y_o$ is a bias in pixels applied to reference the reference point on the image as pixel position 0, and M is a scalar conversion factor converting $X_r$ into pixels.

17. The method of claim 16 wherein the pixel positions are converted to real units of length measurement.

18. The method of claim 7 wherein the method is also used to identify a license plate number, the method further including the steps of, identifying a license plate in an image and identifying the license plate numbers.

19. The method of claim 18 for use with a relational indexed database which correlates the feature height and the license number, the step of determining feature height including the step of, after determining the license plate number, identifying the license number in the database and an associated feature height.

20. The method of claim 18 wherein the step of identifying the license plate numbers includes the step of using automatic optical character recognition to identify the numbers.

21. The method of claim 18 for use with a citation generating printer and a relational index database which correlates vehicle ownership information and the license number, the method further including the steps of, after the speed and license plate number are determined, determining if the speed is in excess of a speed limit and, if the speed is in excess of the speed limit, using the license plate number to look up vehicle ownership information in the database and issuing a citation including image information and the ownership information.

22. The method of claim 21 further including the step of storing the images when a citation is issued.

23. A method for calibrating a system used to determine the speed of a vehicle passing through a viewing field defined by a viewing field angle ω, the system including a camera having a lens positioned a height H above a traffic lane and the lens in a horizontal lens plane angled at least partially downwardly so that a line between the lens and the center of the viewing field defines a known inclination angle I below the lens plane, the method for determining an actual viewing field angle and the actual lens height, the method used with a computer that includes dimension data for at least one dimensioned feature and feature height data for at least two features of different heights of a reference vehicle, the method comprising the steps of:

(a) assuming initial lens height H, inclination angle I and viewing field angle ω approximations where the initial inclination angle is the known inclination angle;

(b) identifying specific sequential images containing the passing of a reference vehicle through the viewing field, sequential images acquired at known time intervals, the reference vehicle including the dimensioned feature and the at least two reference vehicle features of known and different heights;

(c) identifying reference images from the specific sequential images wherein at least one reference image contains the dimensioned feature, at least two images contain the first feature of known height, and at least two images contain the second feature of known height;

(d) determining the apparent displacement of the first feature of known height between the images in which the first feature appears and determining the apparent displacement of the second feature of known height between the images in which the second feature appears;

(e) calculating a new camera height approximation based on the apparent displacements of the features of known heights;

(f) comparing the apparent and actual dimensioned feature dimensions and, where the apparent dimension is larger than the actual dimension and not within a predetermined range:

(i) reducing the initial viewing field angle approximation by a predetermined amount and reducing the predetermined amount; and where the apparent dimension is smaller than the actual dimension and not within the predetermined range:

(ii) increasing the initial viewing field angle approximation by a predetermined amount and reducing the predetermined amount;

(g) re-determining the apparent dimensioned feature dimension with the new viewing field angle;

(h) where the apparent dimension is not within the predetermined range of the actual dimension, repeating steps f and g;

(i) determining the difference between the initial and the new viewing field angle approximations and the difference between the initial and the new height approximations and, where the differences are below a predetermined magnitude, skipping to step k;

(j) repeating steps a through i with the new height approximation as the initial height approximation and the new viewing angle approximation as the initial approximation; and (k) storing the new height approximation and the new viewing field angle approximation for use in determining vehicle speed.

24. The method of claim 23 wherein the actual dimension includes a reference dimension that is substantially parallel to the direction of vehicle movement, the reference dimension being a feature length L, the reference vehicle features of known height being one feature at an actual height of Q from the ground plane and the other feature being at an actual height P from the height Q, the step of identifying specific sequential images including the steps of:

generating at least two images wherein the dimensioned feature is in the viewing field when at least one of the two images is generated, the first feature of known height is in at least two images and the second feature of known height is in at least two images.

25. The method of claim 23 wherein the dimensioned feature is the length of a substantially horizontal reference vehicle component.

26. The method of claim 25 wherein the dimensioned feature is the length of the reference vehicle's roof.

27. The method of claim 23 wherein the actual dimension includes a reference dimension that is substantially parallel to the direction of vehicle movement, the reference dimension being a feature length L, the reference vehicle features of known height being one feature at an actual height of Q from the ground plane and the other feature being at an actual height P from the height Q, the step of identifying specific sequential images including the steps of:

generating a first image while the dimensioned feature and the first feature of known height are in the viewing field;

generating a second image while the first and second features of known height are in the viewing field; and generating a third image while the second feature of known height is in the viewing field.

28. The method of claim 27 for use with an apparatus including a screen for displaying the images, the screen including a plurality of pixels that together form the images, the screen including a reference point, the step of determining the dimensioned feature dimensions including the steps of:

displaying the first image on the screen;

identifying the boundaries of the dimensioned feature; and counting the number of pixels between the boundaries;

and the step of determining the apparent displacement of the reference features includes the steps of, for the first feature of known height:

displaying the first image on the screen;

identifying a position of the first feature in the first image;

counting the number of pixels between the reference point and the first feature position in the first image to provide a first pixel position;

displaying the second image on the screen;

identifying a position of the first feature in the second image;

counting the number of pixels between the reference point and the first feature position in the second image to provide a second pixel position;

compensating both the first and second pixel positions; and subtracting the first from the second pixel positions; and, for the second feature of known height:

displaying the second image on the screen;

identifying a position of the second feature in the second image;

counting the number of pixels between the reference point and the second feature position in the second image to provide a third pixel position;

displaying the third image on the screen;

identifying a position of the second feature in the third image;

counting the number of pixels between the reference point and the second feature position in the third image to provide a fourth pixel position;

compensating both the third and fourth pixel positions; and subtracting the third from the fourth pixel positions.

29. The method of claim 28 wherein the step of compensating includes the step of solving the following equation for each of the feature positions:

$$X_r = K(H,I,\omega) = H \tan I \cdot \frac{S_n - Y_0}{\left(\frac{MH}{\cos I} + Y_0\right) - S_n}$$

where $X_r$ is the actual position of the one feature, $S_n$ is the number of pixels between the reference point and the one feature in an image, $Y_0$ is a bias in pixels applied to reference the reference point on the image as pixel position 0 and M is a scalar conversion factor converting $X_r$ into pixels.

30. The method of claim 29 wherein the first, second, third, and fourth compensated pixel positions are M1', M2', M3' and M4' respectively, and the step of calculating a new camera height includes the step of solving the following equation:

$$H = Q + \frac{P \cdot (M2' - M1')}{(M2' - M1') - (M4' - M3')}$$

31. The method of claim 29 wherein the dimensioned feature is the length of the reference vehicle's trunk lid.

32. A method for calibrating a camera and computer system used to determine the speed of a vehicle passing through a viewing field defined by a camera viewing field angle $\omega$, the system including a camera having a lens positioned a height H above a traffic lane and the lens in a horizontal lens plane angled at least partially downwardly so that a line between the lens and the center of the viewing field defines a known inclination angle I below the lens plane, the method comprising the steps of:

(i) measuring the inclination angle I;

(ii) determining the actual camera height H and an optimal viewing field angle $\omega$;

(iii) adjusting the camera so as to provide the optimal viewing field angle; and (iv) providing software code that compensates for image distortion due to the viewing field angle, the inclination angle and the camera height.

33. The method of claim 32 wherein the computer that includes dimension data for at least one dimensioned feature and feature height data for at least two features of different heights of a reference vehicle, the step of determining including the steps of:

(a) assuming initial lens height H and viewing field angle $\omega$ approximations;

(b) identifying specific sequential images containing the passing of a reference vehicle through the viewing field, sequential images acquired at known time intervals, the reference vehicle including the dimensioned and the at least two reference vehicle features of known and different heights;

(c) identifying reference images from the specific sequential images wherein at least one reference image contains the dimensioned feature, at least two images contain the first feature of known height and at least two images contain the second feature of known height;

(d) determining the apparent displacement of the features of known heights between the reference images and an apparent dimensioned feature dimension;

(e) calculating a new camera height approximation based on the apparent displacements of the reference features of known height;

(f) comparing the apparent and actual dimensioned feature dimensions and, where the apparent dimension is larger than the actual dimension and not within a predetermined range:
  (i) reducing the initial viewing field angle approximation by a predetermined amount and reducing the predetermined amount; and
where the apparent dimension is smaller than the actual dimension and not within the predetermined range:
  (ii) increasing the initial viewing field angle approximation by a predetermined amount and reducing the predetermined amount;

(g) re-determining the apparent dimensioned feature dimension with the new viewing field angle;

(h) where the apparent dimension is not within the predetermined range of the actual dimension, repeating steps f and g;

(i) determining the difference between the initial and the new viewing field angle approximations and the difference between the initial and the new height approximations and, where the differences are below a predetermined magnitude, skipping to step k;

(j) repeating steps a through i with the new height approximation as the initial height approximation and the new viewing angle approximation as the initial approximation; and (k) storing the new height approximation and the new viewing field angle approximation for use in determining vehicle speed.

34. The method of claim 33 wherein the actual dimension includes a reference dimension that is substantially parallel to the direction of vehicle movement, the reference dimension being a feature length L, the reference vehicle features of known height being one feature at an actual height of Q from the ground plane and the other feature being at an actual height P from the height Q, the step of identifying specific sequential images including the steps of:

generating a first image while the dimensioned feature and the first feature of known height are in the viewing field;

generating a second image while the first and second features of known height are in the viewing field; and generating a third image while the second feature of known height is in the viewing field.

35. The method of claim 34 for use with an apparatus including a screen for displaying the images, the screen including a plurality of pixels that together form the images, the screen including a reference point, the step of determining the dimensioned feature dimensions including the steps of:

displaying the first image on the screen;
  identifying the boundaries of the dimensioned feature; and
  counting the number of pixels between the boundaries;
  and the step of determining the apparent displacement of the reference features includes the steps of, for the first feature of known height:
  displaying the first image on the screen;
  identifying a position of the first feature in the first image;
  counting the number of pixels between the reference point and the first feature position in the first image to provide a first pixel position;
  displaying the second image on the screen;
  identifying a position of the first feature in the second image;
  counting the number of pixels between the reference point and the first feature position in the second image to provide a second pixel position;
  compensating both the first and second pixel positions; and
  subtracting the first from the second pixel positions; and, for the second feature of known height:
  displaying the second image on the screen;
  identifying a position of the second feature in the second image;
  counting the number of pixels between the reference point and the second feature position in the second image to provide a third pixel position;
  displaying the third image on the screen;
  identifying a position of the second feature in the third image;
  counting the number of pixels between the reference point and the second feature position in the third image to provide a fourth pixel position;
  compensating both the third and fourth pixel positions; and
  subtracting the third from the fourth pixel positions.

36. The method of claim 35 wherein the step of compensating includes the step of solving the following equation for each of the feature positions:

$$X_r = K(H,I,\omega) = H \tan I \cdot \frac{S_n - Y_0}{\left(\frac{MH}{\cos I} + Y_0\right) S_n}$$

where $X_r$ is the position of the one feature, $S_n$ is the number of pixels between the reference point and the feature in an image, $Y_0$ is a bias in pixels applied to reference the reference point on the image as pixel position 0 and M is a scalar conversion factor converting $X_r$ into pixels, the model feature quantified length being model length L.

* * * * *